United States Patent
Verdun et al.

(10) Patent No.: US 9,197,092 B2
(45) Date of Patent: Nov. 24, 2015

(54) BATTERY CHARGE MANAGEMENT USING USAGE PROFILING

(71) Applicant: Dell Products L.P., Round Rock, TX (US)

(72) Inventors: Gary Verdun, Georgetown, TX (US); Richard C. Thompson, Cedar Park, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 440 days.

(21) Appl. No.: 13/663,541

(22) Filed: Oct. 30, 2012

(65) Prior Publication Data

US 2014/0117945 A1    May 1, 2014

(51) Int. Cl.
| | |
|---|---|
| H02J 7/00 | (2006.01) |
| H02J 7/02 | (2006.01) |
| H02J 7/08 | (2006.01) |
| H02J 7/04 | (2006.01) |
| G06F 1/32 | (2006.01) |

(52) U.S. Cl.
CPC ............... *H02J 7/02* (2013.01); *H02J 7/0014* (2013.01); *H02J 7/0022* (2013.01); *H02J 7/042* (2013.01); *H02J 7/082* (2013.01); *G06F 1/3212* (2013.01)

(58) Field of Classification Search
CPC ....... H02J 7/0022; H02J 7/0014; H02J 7/042; H02J 7/082
USPC .................................................. 320/162, 106
See application file for complete search history.

(56) References Cited

U.S. PATENT DOCUMENTS 4,709,202 A * 11/1987 Koenck et al. ................. 320/112
4,845,419 A *  7/1989 Hacker ......................... 320/136

* cited by examiner

*Primary Examiner* — M'Baye Diao
(74) *Attorney, Agent, or Firm* — Terrile, Cannatti, Chambers & Holland, LLP; Stephen A. Terrile (57) ABSTRACT

A battery management system calculates expected run time for the information handling system from either an average or instantaneous power consumption and the remaining battery capacity. When power is attached to the battery, the battery management system compares an expected run time with a current usage day profile. If the information handling system is operating in a non-active use period or if system run time can extend sufficiently into the non-use period then a slow charge rate is applied which will charge the batteries up to a substantially charged state (e.g., 80-95% of full capacity) and top off of the battery is deferred such that battery is fully charged somewhat before the average beginning of the next day (e.g., approximately one to two hours before the average beginning of the next day).

12 Claims, 8 Drawing Sheets

BATTERY CHARGE MANAGEMENT USING USAGE PROFILING

BACKGROUND OF THE INVENTION

1. Field of the Invention

The present invention relates to information handling systems and more particularly to information handling system battery charge management using usage profiling.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One issue for information handling systems, especially portable information handling systems, relates to battery charge management. In information handling systems, as well as other devices which include rechargeable batteries, the amount of time the battery spends fully charged is a primary wear out factors due to voltage stress. Users that leave their systems plugged in all the time such as certain corporate docked scenarios or users that plug in every night can accumulate significant amounts of time at a fully charged state thus potentially causing reduced run times and early need to replace batteries.

SUMMARY OF THE INVENTION

In accordance with the present invention, battery charge management using usage profiling is set forth. More specifically, in certain embodiments, a battery management system calculates expected run time for the information handling system from either an average or instantaneous power consumption and the remaining battery capacity. When power is attached to the battery, the battery management system compares an expected run time with a current usage day profile. If the information handling system is operating in a non-active use period or if system run time can extend sufficiently into the non-use period then a slow charge rate is applied which will charge the batteries up to a substantially charged state (e.g., 80-95% of full capacity) and top off of the battery is deferred such that battery is fully charged somewhat before the average beginning of the next day (e.g., approximately one to two hours before the average beginning of the next day). By deferring when the battery is fully charged, battery degradation due to issues such as voltage stress can be reduced.

In certain embodiments, the battery management system tracks a typical usage profile (e.g., for each day of the week) for the information handling system. In certain embodiments, a typical start of day and end of day for each day of the week is calculated based upon an average for a predetermined number of days (e.g., the last two-sixteen days) of the same day of the week. In various embodiments, the battery management system is located within a battery management unit (BMU), basic input output system (BIOS) or application executing on the information handling system.

More specifically, in one embodiment the invention relates to a computer-implementable method for managing a battery comprising: calculating an expected run time for a system; determining a system run start value and a system run end value; determining whether the expected run time of the system extends beyond the system run end value; and when the expected run time of the system extends beyond the system run end value charging the battery to a substantially charged state topping off the battery to a fully charged state slightly before the system run start value of a next subsequent period.

In another embodiment, the invention relates to a system comprising: a processor; a data bus coupled to the processor; and a non-transitory, computer-readable storage medium embodying computer program code, the non-transitory, computer-readable storage medium being coupled to the data bus. The computer program code interacts with a plurality of computer operations and comprises instructions executable by the processor and configured for: calculating an expected run time for a system; determining a system run start value and a system run end value; determining whether the expected run time of the system extends beyond the system run end value; and when the expected runt time of the system extends beyond the system run end value charging the battery to a substantially charged state topping off the battery to a fully charged state slightly before the system run start value of a next subsequent period.

In another embodiment, the invention relates to a non-transitory, computer-readable storage medium embodying computer program code, the computer program code comprising computer executable instructions configured for: calculating an expected run time for a system; determining a system run start value and a system run end value; determining whether the expected run time of the system extends beyond the system run end value; and when the expected run time of the system extends beyond the system run end value charging the battery to a substantially charged state topping off the battery to a fully charged state slightly before the system run start value of a next subsequent period.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
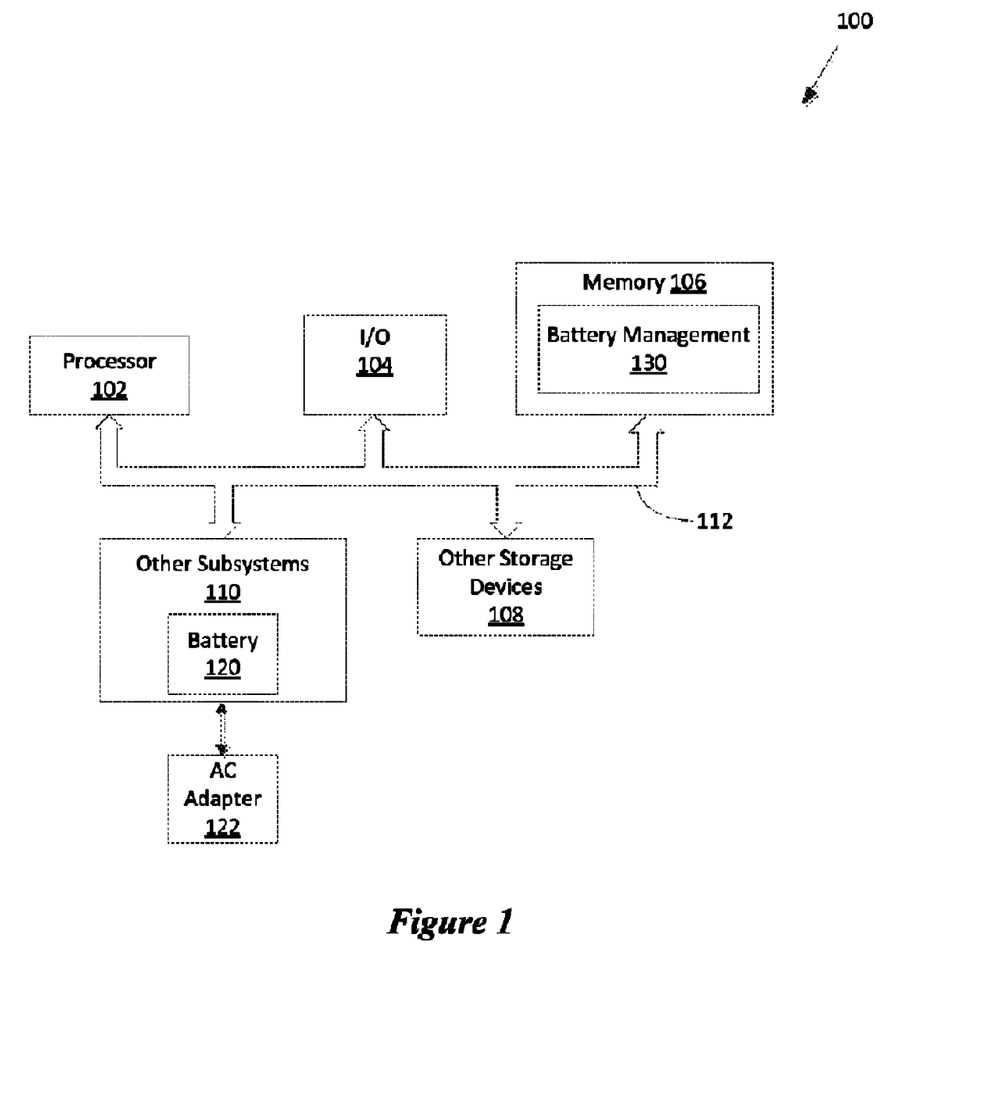
FIG. 1 shows a system block diagram of an information handling system.

Referring briefly to FIG. 1, a system block diagram of an information handling system 100 is shown. The information handling system 100 includes a processor 102, input/output (I/O) devices 104, such as a display, a keyboard, a mouse, and associated controllers (each of which may be coupled remotely to the information handling system 100), a memory 106 including volatile memory such as random access memory (RAM) and non-volatile memory such as a hard disk and drive, and other storage devices 108, such as an optical disk and drive and other memory devices, and various other subsystems 110, such as a rechargeable battery 120, all interconnected via one or more buses 112. The battery 120 is further coupled to power via e.g., an alternating current (AC) adapter 122.

Additionally, the memory 106 stores a battery management system 130 which is executed by the processor 102. In general, the battery management system 130 calculates expected run time for the information handling system from either an average or instantaneous power consumption and the remaining battery capacity. When power is attached to the battery 120, the battery management system 130 compares an expected run time with a stored usage profile. If the information handling system 100 is operating in a non-active use period or if system run time can extend sufficiently into the non-use period then a slow charge rate is applied which charges the battery 120 up to a substantially charged state (e.g., 80-95% of full capacity) and top off of the battery 120 is deferred such that battery 120 is fully charged somewhat before the average beginning of the next day (e.g., approximately one to two hours before the average beginning of the next day). In various embodiments each of these parameters may be individually configurable such as by an end use or IT service personnel.

The battery management system 130 tracks a typical usage profile (e.g., for each day of the week) for the information handling system. In certain embodiments, a typical start of day and end of day for each day of the week is calculated based upon an average for a predetermined number of days (e.g., the last two-sixteen days) of the same day of the week.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
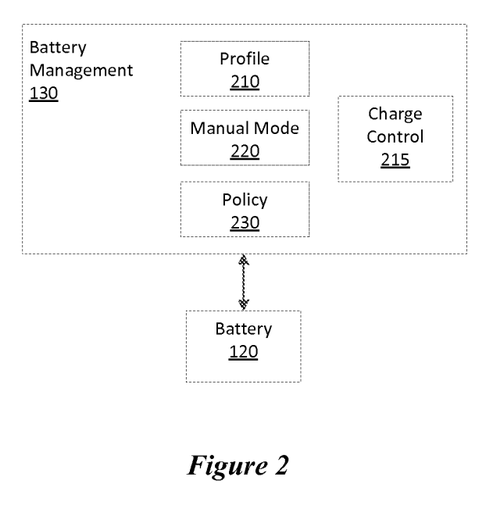
FIG. 2 shows a block diagram of a battery management system.

Referring to FIG. 2, a block diagram of the battery management system 130 is shown. The battery management system 130 dynamically controls the charge into the battery 120 to minimize stresses that accelerate wear out of the battery. Wear out may be generally defined as not being able to perform the battery's intended function. More specifically, wear out is defined as the reduction in full charge capacity as compared to the initial full charge capacity of the battery when new. There are at least two types of wear out, capacity degradation and impedance growth. Impedance growth relates to the apparent capacity of the battery. Impedance growth limits the ability of the battery to operate under certain conditions such as high current or low ambient temperature. The battery management system 130 controls charging of the battery with the intent to maximize available charge to the end user while minimizing wear out stresses applied to the battery cells.

The battery management system 130 includes a profile portion 210, a charge control portion 215, a manual mode portion 220 and a policy portion 230. The profile portion 210 monitors the use of the information handling system 100 and generates usage profiles (e.g., daily usage profiles) which can then be used to provide fast charge control.

More specifically, the profile portion 210 (which in various embodiments may be included within either a BMU, Basic Input Output System (BIOS) or Embedded Controller EC) profiles user activity and generates a most likely to use the system block or blocks of time within a predetermined (e.g., 24 hour) time period. The profile portion performs the usage tracking to generate a histogram of usage of the information handling system. In certain embodiments, the usage tracking is performed by day of week and effectively creates a histogram of daily usage time.

The charge control portion 215 uses the information obtained via the profile portion to control charging of the battery 120 such that charge cycles in a predominately non-use time of day will be standard or slow charge. Additionally, the charge control portion 215 uses the information obtained via the profile portion to control charging of the battery 120 such that charge cycles in active period of day use a fast charge scenario. Additionally, The charge control portion 215 uses the information obtained via the profile portion to control charging of the battery 120 such that charge cycles that end (would normally cause a transition to top off mode) during non-use time of day cause charging to stop at a substantially charged condition (e.g., approximately 90% of full charge) and waits until shortly before normal use will resume (e.g., two hours before the beginning of normal use time of day) to initiate a charge top off operation.

During a normal daily usage time when the AC adapter 122 is plugged in and the charge level is sufficiently low to warrant a charge cycle, the battery management system 130 calculates an estimated remaining run time of the system. If the projected run time becomes greater than a predetermined time value (e.g., two hours) beyond an end of normal daily usage then the battery management system 130 enters a standard charge mode of operation.

The manual mode portion 220 allows the battery management system to enter an optional manual mode of operation (such as during travel) where the user desires to manually override the charge control mode of operation. During the optional manual mode of operation during which a fast charge is applied to the battery 120 for a set amount of time (e.g., three days). The user can input this set amount of time or the system can apply a preset set amount of time (e.g., three days).

The policy portion 230 provides a management interface to the battery management system 130. The management interface allows information technology (IT) providers to set policies which control the battery management settings or selections for an individual user or for groups of users.

The battery management system 130 tracks or calculates a plurality of variables when performing battery management operations. More specifically, the battery management system tracks:

$BOD_{AVG}$ (Beginning of Day) which represents an average of a number of time stamps (e.g., the last 2-32 time stamps) for First user present activity of the day;

$EOD_{AVG}$ (End of Day) which represents an average of a number of time stamps (e.g., the last 2-32 time stamps) for Last user present activity of the day;

$PWR_{AVG}$ (Average Power) which represents an average of the last 32 days of (capacity at BOD–capacity at EOD) divided by time on battery that day % time on battery for the given day;

$BOD_{BUF}$ (Beginning of Day Buffer) which represents a time value used to adjust BOD earlier for certain calculations;

$EOD_{BUF}$ (End of Day Buffer) which represents a time value used to adjust EOD later for certain calculations; and $T_{RUN}$ (Run Time) which represents a calculated time that the system can operate on remaining battery capacity.

In operation, the battery management system 130, for each day of the week computes running average start and end times for the user. In certain embodiments, the average start time is the average of the last 32 first start of the day for the given day of week. The average end time is the average of the last 32 turn off times for that day of week.

When some of the running averages are not populated with valid average of 32 consecutive time values, the average is computed by averaging the current number of valid time values. Table 1 shows an example of table values to be stored. The Table is populated with initial values to be used at user first turn on.

involved turn-off of the day. The turn-on and turn-off terms are used to indicate use of the platform by the end user. In various embodiments, the method for determining the turn-on and turn-off values vary depending on an information handling system usage model and different known operating system conditions such as the Smart Connect operating feature by Intel and the Connected Standby operating feature by Microsoft.

Additionally, in certain embodiments, the power state for a graphics controller (also referred to as a graphics processor controller (GPU) of the information handling system can be used as a user present usage indication for purposes of battery management. First graphics controller turn-on of day and last graphics controller turn-off of day may be tracked as indications of user turn-on and turn-off events. Alternately, in certain embodiments, such as legacy systems which are executing older versions of operating systems, state transitions, such as an Advanced Configuration and Power Interface (ACPI) S0 state transition, can identify a first and last use of a day. Other operating systems and usages may have alternate methods of determining user turn on and turn off events.

Additionally, in certain embodiments, such as systems executing a Windows 8 type operating system, a Windows 8 (Win8) connected standby condition may be present. With a Win8 Connected Standby (CS) condition, the operating system generally does not leave the S0 state. However, the Win8 connected standby condition is a pseudo S3 S4 state condition and as such may have devices put into run time D3. With these systems ACPI code may be developed that that places a system into runtime D3 during CS and then transfers this status to the EC as an indication of user present on-off events. Power button and lid closing and opening operations are examples operations which may cause Win8 standby conditions. For example, the beginning of day may be determined based upon a first power button press or lid open event of the day (or the first display turn on of the day). The end of the day may be determined based upon a last power button press or lid close event of the day (or the last display turn off of the day).

The battery management system 130 estimates run time to determine if the system is able to run on battery past the end

TABLE 1

|  | Monday | Tuesday | Wednesday | Thursday | Friday | Saturday | Sunday |
|---|---|---|---|---|---|---|---|
| $BOD_{AVG}$ | 8:00 AM | 8:00 AM | 8:00 AM | 8:00 AM | 8:00 AM | 8:00 AM | 8:00 AM |
| $EOD_{AVG}$ | 6:00 PM | 6:00 PM | 6:00 PM | 6:00 PM | 6:00 PM | 6:00 PM | 6:00 PM |
| $PCNT_{BAT}$ | 90 | 90 | 90 | 90 | 90 | 50 | 50 |
| $PWR_{AVG}$ (W) |  |  |  | 8 |  |  |  |
| $BOD_{BUF}$ (hr) | 1 | 1 | 1 | 1 | 1 | 1 | 1 |
| $EOD_{BUF}$ (hr) | 2 | 2 | 2 | 2 | 2 | 2 | 2 |

The profile module 210 and the manual mode portion 220 also track current time zone information. By tracking time zone information, the battery management system 130 prevent having a very large start or end time error due to traveling to different time zone. The manual mode portion 220 adjusts the time zone by either manual control provided via the user or via a BIOS synchronization operation with the time function of the operating system of the information handling system.

The battery management system 130 identifies a beginning of day (BOD) and end of day (EOD) across a plurality of platforms. More specifically, the battery management system identifies a first user involved turn-on of the day and last user of day plus end of day buffer time. In certain embodiments, the system run time to end of battery is calculated using current battery remaining capacity and an average system power where energy consumed during last user present operation that exceeded one hour in length (Battery capacity at system startup–battery capacity at system shut down) divided by the time the system was in S0. More specifically, the battery run time is calculated as follows:

$$P_{avg} = \frac{C_{boot}(Whr) - C_{shutdwn}(Whr)}{t_{shutdwn}(hr) - t_{boot}(hr)}$$

-continued $$T_{end} = T_{now} + \frac{C_{remain}(Whr)}{P_{avg}(W)}$$

Where:
$C_{boot}$ Battery Capacity at time system became active
$C_{shutdwn}$ Battery Capacity at time system became inactive
$C_{remain}$ Battery Capacity at time of run time calculation Cremain=Current battery capacity−OS critical shutdown capacity $P_{avg}$ Average system power over last active period
$T_{boot}$ Time at which system became active
$T_{shutdwn}$ Time at which system became inactive
$T_{now}$ Time at calculation of remaining run time
$T_{end}$ Time at which battery expected to be empty Average power is calculated for active periods longer than 1 hr where $P_{avg}$ is a running average of the last 8 active periods.

Alternately, in certain embodiments, look up tables based upon a typical system average power consumption or some averaging of current battery power drain information may be used to determine battery run time.

The battery management system 130 periodically performs event tracking and analysis operations. More specifically, in certain embodiments, the charge profile analysis is performed at every AC plug event and every 10 minutes during a charge cycle. The charge profile analysis includes battery run time calculations as well a run time vs. end of day calculations. Additionally, average Power calculations are performed at AC plug event. Additionally, in certain embodiments, aging functions are calculated once daily instead of every AC plug event in the day.

Additionally, in certain embodiments, the battery management system 130 provides a plurality of remote management capabilities. An IT provider can set individual and/or group battery management policies via the battery management system 130. More specifically, the IT provider can remotely enable or disable usage profiling, can disable an express charge operation, can force or push a particular usage profile, can program or preset particular beginning of day and end of day values, and/or can disable user control of IT set functions.

Figure 3:
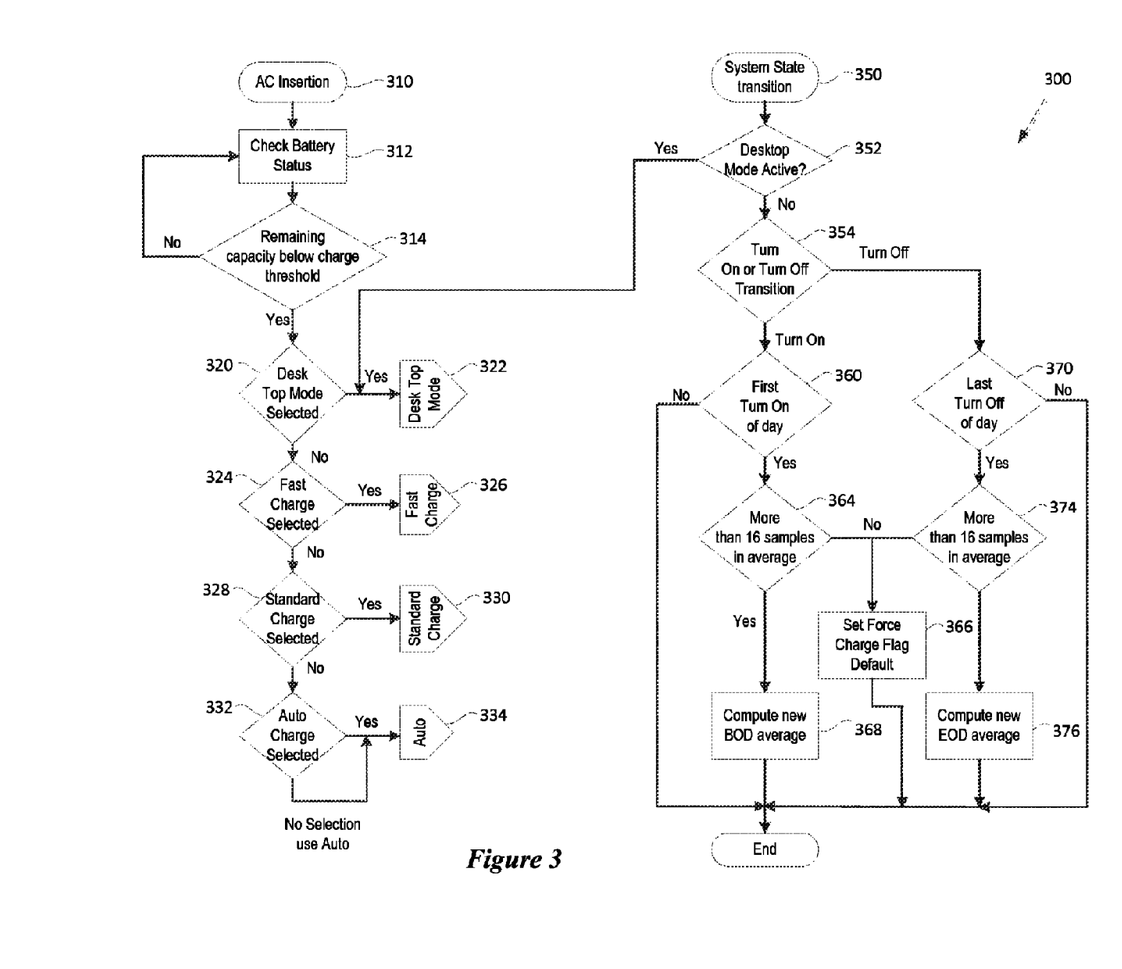
FIG. 3 shows a flow chart of the operation of a charge mode control function of the battery management system.

Referring to FIG. 3, a flow chart of the operation of charge mode control function 300 of the battery management system 130 is shown. More specifically, upon AC insertion at step 310, the battery management system 130 checks the battery status at step 312 and determines whether the remaining capacity of the battery 120 is below a charge threshold at step 314. If not, then the battery management system 130 periodically repeats the check battery status operation of step 312.

If the remaining capacity of the battery 120 is below a charge threshold then the battery management system 130 determines whether a desk top mode of operation is selected at step 320. If yes, then the battery management system 130 enters a desk top mode of operation at step 322. If no, then the battery management system 130 determines whether a fast charge mode of operation is selected at step 324. If yes, then the battery management system 130 enters a fast charge mode of operation at step 326. If no, then the battery management system 130 determines whether a standard charge mode of operation is selected at step 328. If yes, then the battery management system 130 enters a standard charge mode of operation at step 330. If no, then the battery management system 130 determines whether an automatic charge mode of operation is selected at step 332. If yes, then the battery management system 130 enters an automatic charge mode of operation at step 334. If no, then the battery management system 130 defaults to a determination of no charge mode being selected and enters the automatic charge mode of operation at step 334.

Alternately, the charge mode control function 300 is accessed by the battery management system 130 upon detection of a system state transition at step 350. Upon detecting a system state change at step 350, the battery management system 130 then determines whether a desk top mode of operation is active at step 352. If yes, then the battery management system 130 enters a desk top mode of operation at step 322. If no, then the battery management system 130 determines whether the system state change was a turn on state change or a turn off state change at step 354.

If the system state change was a turn on state change then the battery management system determines whether the turn on state change was the first turn on of the day at step 360. Next, the battery management system 130 determines whether there are more than a predetermined number (e.g., 16) of samples in the average at step 364. If no, then the battery management system 10 sets a force default charge flag active to cause the battery management system 130 to force a default charge operation. If yes, then the battery management system 130 computes a new beginning of day average taking into account the new turn on state change information at step 368. It will be appreciated that other methods of calculating the beginning of day average are also contemplated. By providing an option of forcing a default charge operation, the slow charge operation and top off operations are deferred until a valid sample usage pattern is established.

If the system state change was a turn off state change then the battery management system determines whether the turn off state change was the last turn off of the day at step 370. Next, the battery management system 130 determines whether there are more than a predetermined number (e.g., 16) of samples in the average at step 374. If no, then the battery management system 130 sets a force default charge flag active at step 366 to cause the battery management system 130 to force a default charge operation. If yes, then the battery management system 130 computes a new end of day average taking into account the new turn off state change information at step 372. It will be appreciated that other methods of calculating the end of day average are also contemplated.

Figure 4:
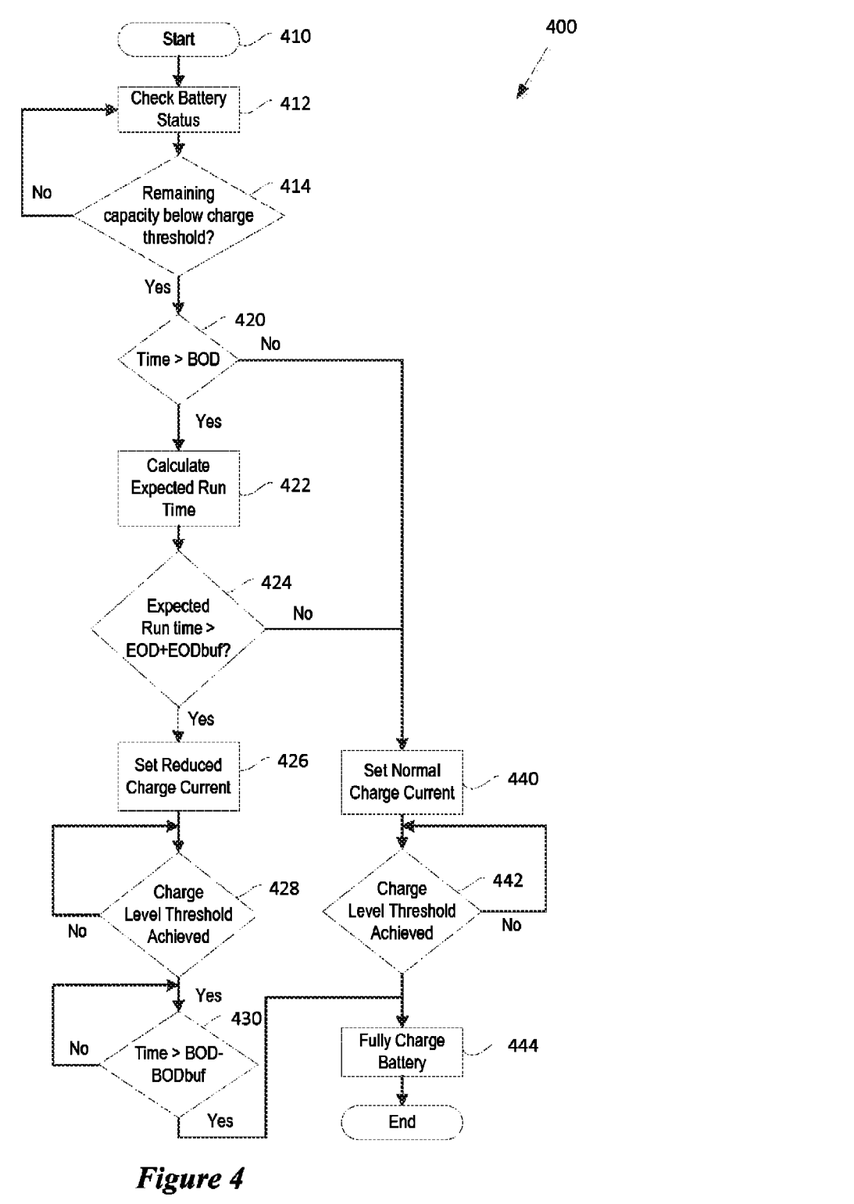
FIG. 4 shows a flow chart of the operation of a usage profile battery charge management function of the battery management system.

Referring to FIG. 4, a flow chart of the operation of a usage profile battery charge management function 400 of the battery management system 130 is shown. More specifically, upon starting the usage profile battery charge management function at step 410, the battery management system 130 checks the battery status at step 412 and determines whether the remaining capacity of the battery 120 is below a charge threshold at step 414. If not, then the battery management system 130 periodically repeats the check battery status operation of step 432.

If the remaining capacity of the battery 120 is below a charge threshold then the battery management system 130 determines whether the present time if after the beginning of the day value at step 420. If yes, then the battery management system 130 calculates an expected run time at step 422. The battery management system 130 then determines whether the expected run time extends beyond a combination of the end of day value and an end of day buffer value at step 424. If yes, then the battery management system 130 configures a reduced charge current at step 426. The battery management system 130 then determines whether a charge level threshold (such as when the battery has achieved a substantially charged condition) has been achieved at step 428. If no, then the battery management system 130 continues to monitor the voltage at step 428 until the charge level threshold has been reached. Next, the battery management system 130 determines whether the time of day is later than a combination of the beginning of day value and a beginning of day buffer value at step 430. If no, then the battery management system 130 continues to monitor the time of day until the time of day is later than a combination of the beginning of day value and a beginning of day buffer value.

If the time of day is not later than the beginning of day value as determined at step 420, then the battery management system 130 configures a normal charge at step 440. The battery management system 130 then determines whether a charge level threshold has been achieved at step 442. If no, then the battery management system 130 continues to monitor the voltage at step 442 until the charge level threshold has been reached and then enters a normal battery charge mode of operation at step 444 to fully charge the battery and completes operation of the usage profile battery charge management function 400.

If the expected run time extends beyond a combination of the end of day value and an end of day buffer value as determined at step 424, then the battery management system 130 configures a high current charge at step 440. If the time of day is later than a combination of the beginning of day value and a beginning of day buffer value as determined by step 430, then the battery management system 130 configures a high current charge at step 440.

Figure 5:
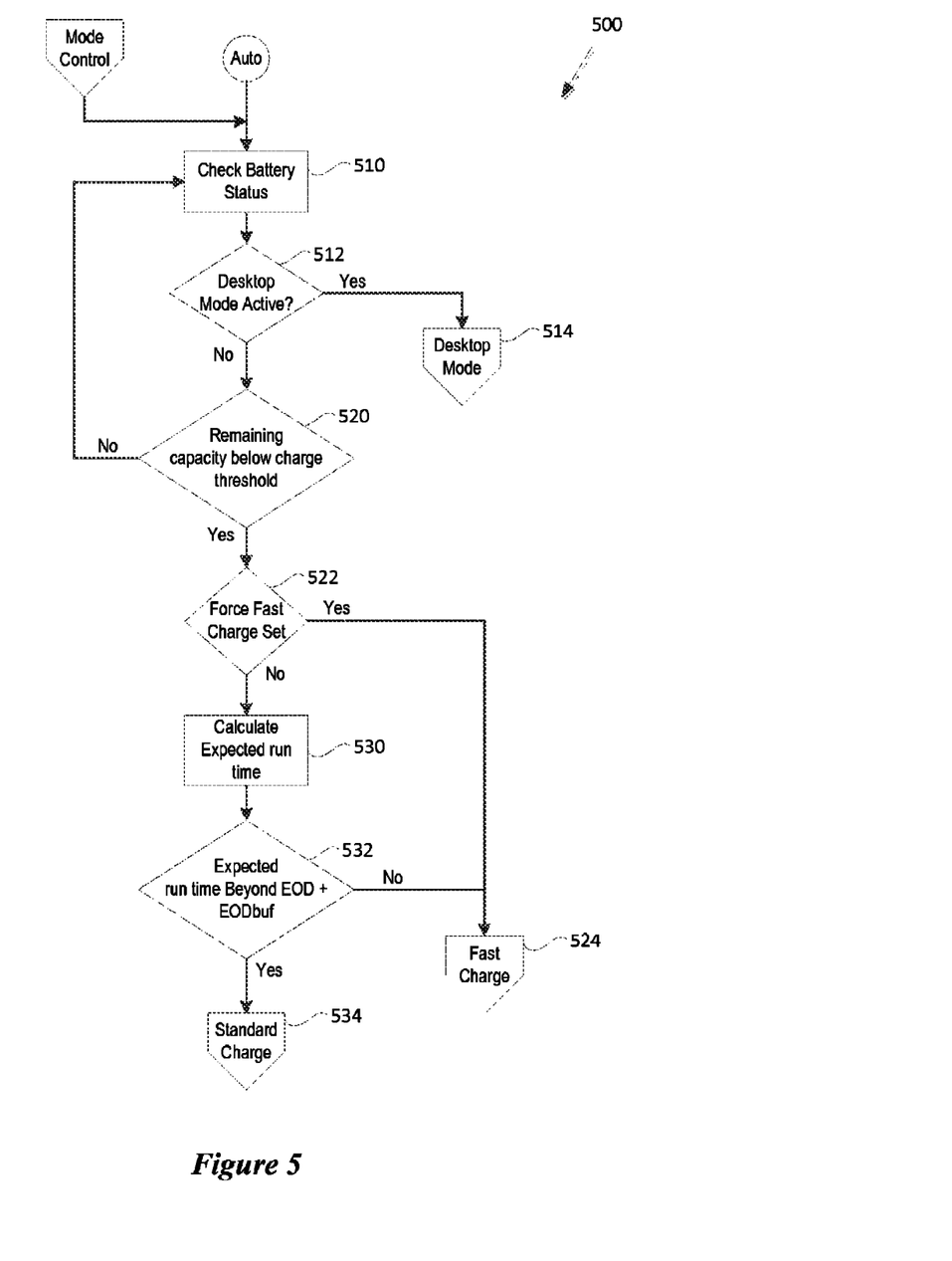
FIG. 5 shows a flow chart of the operation of an automatic charge mode of operation.

Referring to FIG. 5, a flow chart of the operation of an automatic charge mode of operation 500 is shown. More specifically, upon entering the automatic charge mode of operation, the battery management system 130 checks the battery status at step 512 and then determines whether a desk top mode of operation is selected at step 514. If yes, then the battery management system 130 enters a desk top mode of operation at step 512. If no, then the battery management system 130 determines whether the remaining capacity of the battery 120 is below a charge threshold at step 520. If not, then the battery management system 130 periodically repeats the check battery status operation of steps 510 and 520.

If the remaining capacity of the battery 120 is below a charge threshold then the battery management system 130 determines whether a force fast charge indication is set at step 522. If yes, then the battery management system 130 enters a fast charge mode of operation at step 524. If not, then the battery management system 130 calculates an expected run time of the system at step 530. Next, the battery management system 130 determines whether the expected runt time exceeds a combination of the end of day value and the end of day buffer value at step 532. If yes, then the battery management system 130 enters a standard charge mode of operation at step 534. If no, then the battery management system 130 enters the fast charge mode of operation at step 524.

Figure 6:
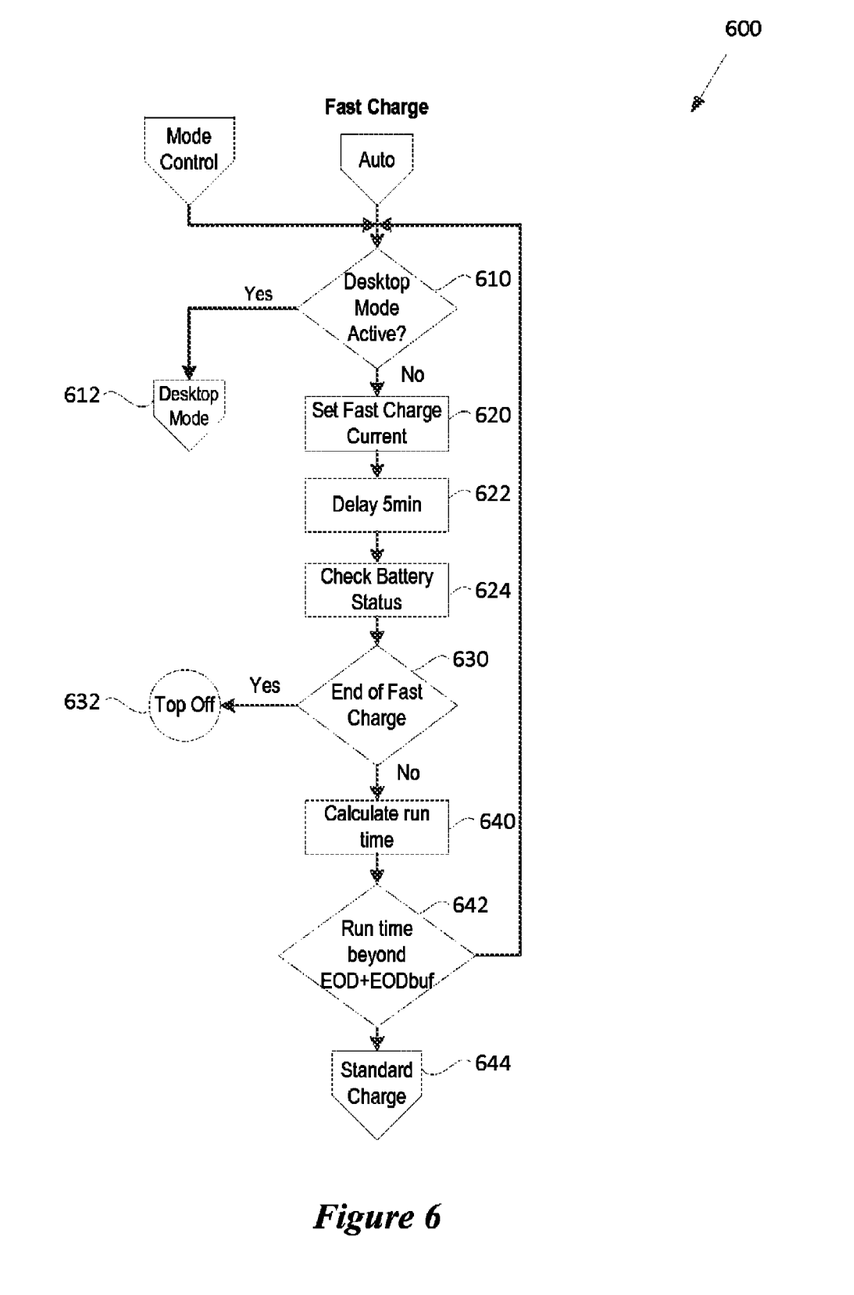
FIG. 6 shows a flow chart of the operation of a fast charge mode of operation.

Referring to FIG. 6, a flow chart of the operation of a fast charge mode of operation 600 is shown. More specifically, upon entering the fast charge mode of operation, determines whether a desk top mode of operation is selected at step 610. If yes, then the battery management system 130 enters a desk top mode of operation at step 612. If no, then the battery management system 130 sets a fast charge current value at step 620. After setting the fast charge current value, the battery management system 130 delays operation for a set amount of time (e.g., five minutes) at step 622 and then checks the battery status at step 624. The battery management system 130 then determines whether to end the fast charge operation at step 630. The fast charge mode of operation is ended when a voltage level of the battery reaches a certain threshold (e.g., the voltage level of the battery is 90% full). If yes, then the battery management system enters a top off mode of operation during which the battery charge is topped off at step 632.

If not, then the battery management system 130 calculates an expected run time of the system at step 640. Next, the battery management system 130 determines whether the expected run time exceeds a combination of the end of day value and the end of day buffer value at step 642. If yes, then the battery management system 130 enters a standard charge mode of operation at step 644. If no, then the battery management system 130 repeats the fast charge mode of operation.

Figure 7:
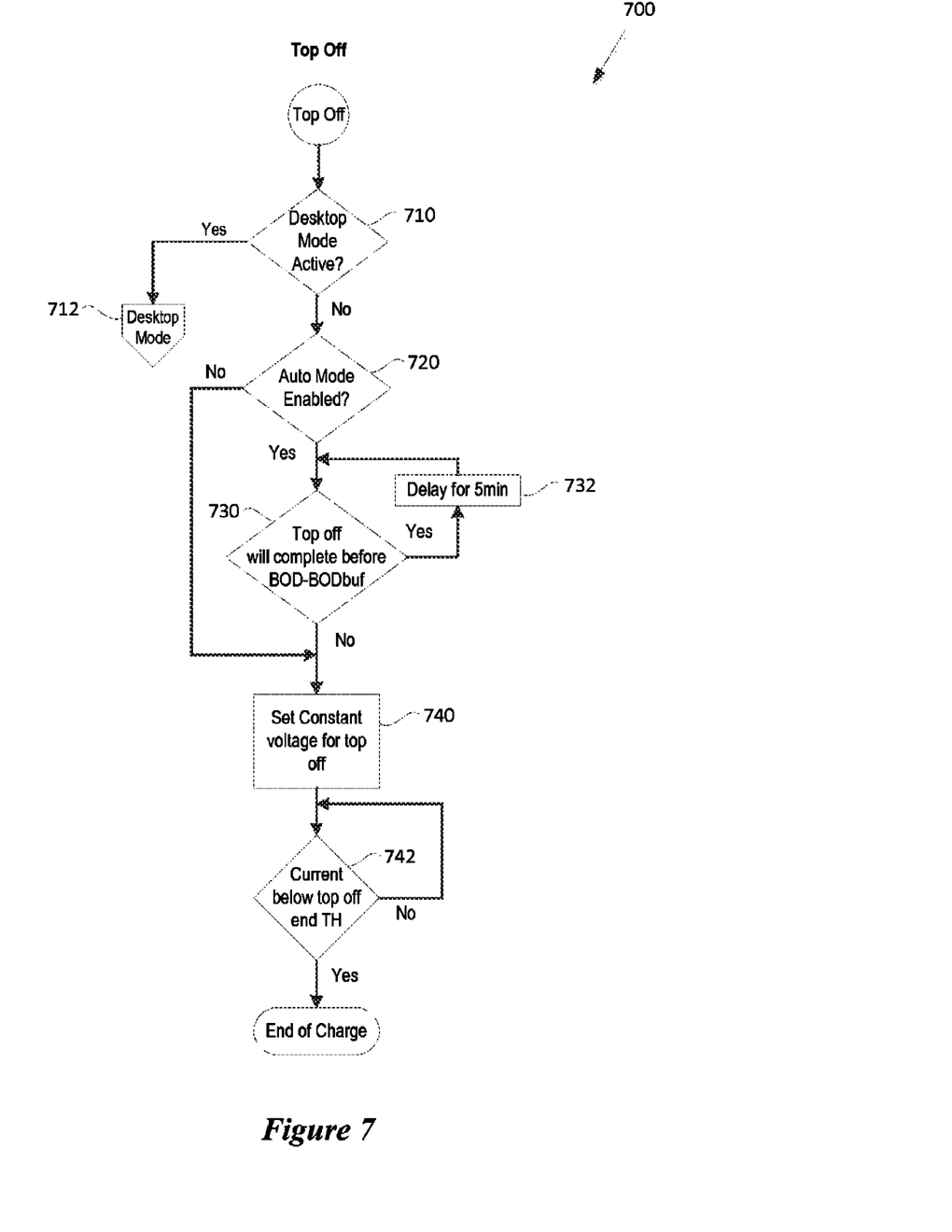
FIG. 7 shows a flow chart of the operation of a top off mode of operation.

Referring to FIG. 7, a flow chart of the operation of a top off mode of operation 700 is shown. More specifically, upon entering the fast charge mode of operation 700, the battery management system 130 determines whether a desk top mode of operation is selected at step 710. If yes, then the battery management system 130 enters a desk top mode of operation at step 712. If no, then the battery management system 130 determines whether an automatic mode of operation is enabled at step 720. If yes, then the battery management system determines whether the top off operation will completed before a difference of the beginning of day value and the beginning of day buffer value at step 730. If yes, the battery management system 130 delays operation for a set amount of time (e.g., five minutes) at step 732 and then the battery management system 130 repeats the determination at step 730. If no, then the battery management system 130 sets a constant voltage value to top off the battery charge at step 740. Next, the battery management system 130 determines whether the current is below a top off value at step 742. If not, then the battery management system 130 continues to monitor the current at step 742. If yes, then the top off operation completes.

Figure 8:
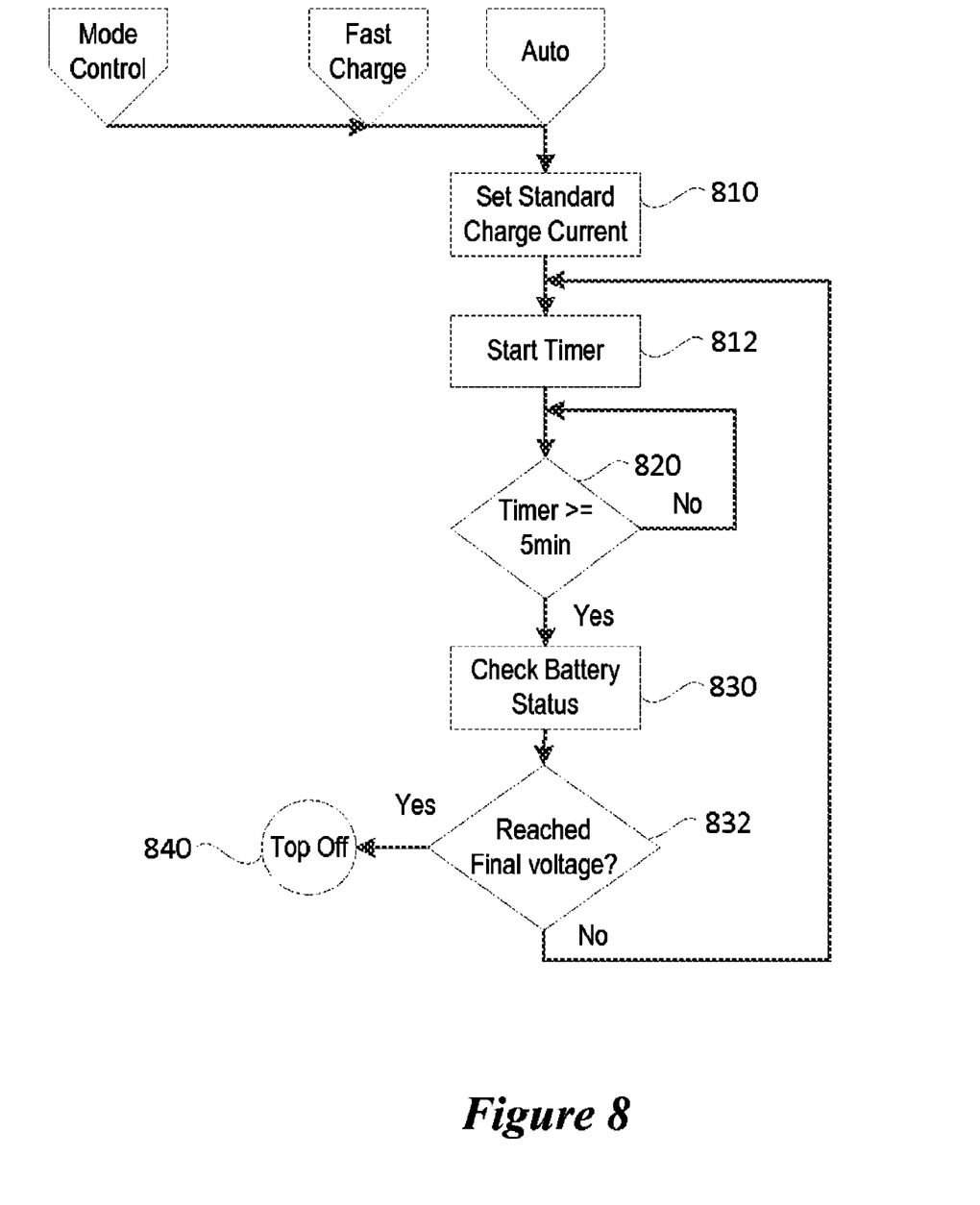
FIG. 8 shows a flow chart of the operation of a standard charge mode of operation.

Referring to FIG. 8, a flow chart of the operation of a standard charge mode of operation 800 is shown. More specifically, the battery management system 130 sets a standard charge current at step 810. Next, at step 812, the battery management system 130 starts a timer to generate a timer value. Next at step 820, the battery management system 130 determines whether the timer value has exceeded a predefined amount of time (e.g., five minutes). If no, then the battery management system continues to monitor the timer value at step 820. If yes, then the battery management system 130 checks the battery status at step 830 and determines whether a final voltage has been reached by the battery at step 832. If yes, then the battery management system 130 proceeds to a top off mode of operation at step 840. If no, then the battery management system returns to start the time at step 820.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Also for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Also for example, in various embodiments, the battery management system may be located within a battery management unit (BMU) which may or may not be included within the battery itself, an Embedded Controller, BIOS or as an application executing on the information handling system.

Consequently, the invention is intended to be limited only by the spirit and scope of the appended claims, giving full cognizance to equivalents in all respects.

What is claimed is:

1. A system comprising:
    a processor;
    a data bus coupled to the processor; and
    a non-transitory, computer-readable storage medium embodying computer program code, the non-transitory, computer-readable storage medium being coupled to the data bus, the computer program code interacting with a plurality of computer operations and comprising instructions executable by the processor and configured for:
        calculating an expected run time for the system;
        determining a system run start value and a system run end value;
        determining whether the expected run time of the system extends beyond the system run end value; and
        when the expected run time of the system extends beyond the system run end value charging the battery to a substantially charged state by topping off the battery to a fully charged state slightly before the system run start value of a next subsequent period.

2. The system of claim 1, wherein:
    the system run start value comprises a beginning of day value and the system run end value comprises an end of day value; and,
    the next subsequent period comprises a next day.

3. The system of claim 1, wherein:
    the substantially charged state corresponds to at least 80 percent of the fully charged state.

4. The system of claim 1, wherein:
    the system run start value and the system run end value are determined based upon system usage profiling.

5. The system of claim 4, wherein:
    the system usage profiling for the system run start value comprises averaging a plurality of system start values; and,
    the system usage profiling for the system run end value comprises averaging a plurality of system end values.

6. The system of claim 1, wherein:
    the topping off the battery to a fully charged state slightly before the system run start value of the next subsequent period comprises starting a topping off operation less than two hours before the start of the next period.

7. A non-transitory, computer-readable storage medium embodying computer program code, the computer program code comprising computer executable instructions configured for:
    calculating an expected run time for a system;
    determining a system run start value and a system run end value;
    determining whether the expected run time of the system extends beyond the system run end value; and
    when the expected run time of the system extends beyond the system run end value charging the battery to a substantially charged state by topping off the battery to a fully charged state slightly before the system run start value of a next subsequent period.

8. The non-transitory, computer-readable storage medium of claim 7, wherein:
    the system run start value comprises a beginning of day value and the system run end value comprises an end of day value; and,
    the next subsequent period comprises a next day.

9. The non-transitory, computer-readable storage medium of claim 8, wherein:
    the substantially charged state corresponds to at least 80 percent of the fully charged state.

10. The non-transitory, computer-readable storage medium of claim 8, wherein:
    the system run start value and the system run end value are determined based upon system usage profiling.

11. The non-transitory, computer-readable storage medium of claim 10, wherein:
    the system usage profiling for the system run start value comprises averaging a plurality of system start values; and,
    the system usage profiling for the system run end value comprises averaging a plurality of system end values.

12. The non-transitory, computer-readable storage medium of claim 5, wherein:
    the topping off the battery to a fully charged state slightly before the system run start value of the next subsequent period comprises starting a topping off operation less than two hours before the start of the next period.

* * * * *